United States Patent
Hammar

(10) Patent No.: US 6,196,730 B1
(45) Date of Patent: Mar. 6, 2001

(54) FIBER OPTIC CONNECTOR CONTAINING A CURABLE ADHESIVE COMPOSITION

(75) Inventor: Walton J. Hammar, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/102,701

(22) Filed: Jun. 22, 1998

(51) Int. Cl.$^7$ .............................. G02B 6/36; G02B 6/38; G02B 6/40

(52) U.S. Cl. ................. 385/76; 385/77; 385/78; 385/80; 385/139; 385/51; 385/60; 427/163.2; 427/386; 427/387; 428/391; 428/392; 428/113; 428/294.1; 428/297.4; 428/300.1; 428/300.7; 428/301.4; 428/343; 428/355 EP; 428/364; 428/375; 428/394; 428/405; 428/407; 428/413; 428/414; 428/417

(58) Field of Search .................. 385/76, 77, 78, 385/80, 82, 139, 51, 60; 156/157, 158, 329, 330, 305; 427/163.2, 386, 387; 428/391, 392, 113, 294.1, 297.4, 300.1, 300.7, 301.4, 343, 346, 347, 349, 355 R, 355 EP, 364, 375, 394, 405, 407, 413, 414, 417; 442/399, 415

(56) References Cited

U.S. PATENT DOCUMENTS

| | | | |
|---|---|---|---|
| 4,028,162 | 6/1977 | Cherin et al. | 156/158 |
| 4,045,121 | 8/1977 | Clark | 350/96 |
| 4,077,702 | 3/1978 | Kunze et al. | 350/96.21 |
| 4,148,559 | 4/1979 | Gauthier | 350/96.21 |
| 4,218,113 | 8/1980 | Uberbacher | 350/96.21 |
| 4,322,127 | 3/1982 | Comerford et al. | 350/96.21 |
| 4,699,462 | 10/1987 | Jones | 350/96.23 |
| 4,767,180 | 8/1988 | Zajac et al. | 350/96.21 |
| 5,024,363 | 6/1991 | Suda et al. | 225/96.005 |
| 5,048,908 | 9/1991 | Blonder et al. | 385/39 |
| 5,048,915 | 9/1991 | Coutts et al. | 385/86 |
| 5,058,984 | 10/1991 | Bulman et al. | 385/80 |
| 5,080,461 | 1/1992 | Pimpinella | 385/65 |
| 5,151,964 | 9/1992 | Carpenter et al. | 385/98 |
| 5,321,784 | 6/1994 | Cubukciyan et al. | 385/78 |
| 5,381,498 | 1/1995 | Bylander | 358/83 |
| 5,381,504 | 1/1995 | Novack et al. | 385/128 |
| 5,422,971 | 6/1995 | Honjo et al. | 385/80 |
| 5,424,383 | * 6/1995 | Kimura et al. | 528/12 |
| 5,539,849 | 7/1996 | Petisce | 385/102 |
| 5,682,451 | 10/1997 | Lee et al. | 385/78 |

FOREIGN PATENT DOCUMENTS

| | | | |
|---|---|---|---|
| 2176073 | 10/1973 | (FR) | C08G/45/00 |
| 2660442 | 10/1991 | (FR) . | |
| 1520161 | 8/1978 | (GB) | C08G/59/50 |
| 58-030703 | 2/1983 | (JP) | G02B/5/14 |

OTHER PUBLICATIONS

Abstract—Reith, L.A. et al, "Reliability of epoxy adhesives in ceramic–ferrule optical connectors", *Chemical Abstracts*, vol. 123, No. 18, Oct. 30, 1985, Columbus, OH.

Yilgör, et al, "1,3–bis(γ–aminopropyl)tetramethyldisiloxane modified epoxy resins: curing and characterization", *Polymer*, vol. 39, Nos. 8–9, pp. 1691–1695.

* cited by examiner

*Primary Examiner*—Robert Dawson
*Assistant Examiner*—Jeffrey B. Robertson
(74) *Attorney, Agent, or Firm*—Darla P. Fonseca

(57) ABSTRACT

A curable adhesive composition for forming a bond between silicone coated optical fibers and fiber connector bodies, said composition comprising:

an epoxy resin component; and a curative admixed therewith. The curative comprises an amino-substituted polysiloxane including more than one primary amino group and having a molecular weight from about 150 to about 1,000. The adhesive composition has an initial viscosity, before curing, below about 100 Pascal-seconds, and the bond has a fiber pull-out force above about 1 Kg. Also provided is fiber optic connector including a holder for one or more optical cables, each optical cable having an optical fiber surrounded by strengthening fibers, both of which are surrounded by at least one polymeric coating layer wherein the optical cable is bonded to the connector by means of the curable adhesive.

11 Claims, 1 Drawing Sheet

FIBER OPTIC CONNECTOR CONTAINING A CURABLE ADHESIVE COMPOSITION

BACKGROUND OF THE INVENTION

1. Field of the Invention

The invention relates to an optical fiber connector, a curable adhesive which is placed into the connector to bond the silicone coated optical fiber to the connector, in order to provide an improved connection between two optical fibers, or an optical fiber and an optoelectronic component.

2. Description of the Related Art

Optical fibers have replaced copper wire as the preferred medium for carrying telecommunications signals. As with copper wire, it is necessary to provide for the interconnection of optical fibers during installation, repair or replacement of the fibers, and to terminate the fibers onto active optical devices. There are generally two kinds of interconnection devices, splices and connectors. The term "splice" usually refers to a device which provides a permanent connection between a pair of optical fibers. The term "connector," in contrast, usually refers to a device which may be engaged and disengaged repeatedly, often with a different plug or receptacle. "Connector" may also refer to the plug portion of a fiber termination, which is attached to an optical device. Optical devices include, for example, optical sensors (photoelectric diodes) and light sources (LED's, laser diodes). The termination of an optical fiber may be indirect, i.e., the fiber may be connected to some other (passive) optical device, such as a beam splitter or polarizer, before the light beam is directed to the active optical device. The present invention is generally directed to a connector, although this term should not be construed in a limiting sense since the present invention may inherently provide a permanent, as well as temporary connection or termination.

In the fiber optic connector described in U.S. Pat. No. 5,381,498, the connector has a plug and a receptacle, the plug having a fiber-receiving, V-shaped groove for each fiber to be interconnected, with the end of the fiber terminating in the middle of the groove. The receptacle has a plate which retracts as the plug is inserted, whereby another fiber is lowered into the V-groove of the plug. Upon full insertion of the plug, the two fiber ends are in contact, and the fiber secured to the receptacle is elastically deformed to maintain a continuous compressive load between the terminal ends of the fibers. The connector provides for the quick disconnection and reconnection of a plurality of optical fiber pairs, without the use of ferrules or other alignment members. High strength fiber may be used to withstand repeated insertions and bowing of the fibers. The exact lengths of fibers (i.e., the relative locations of their terminal ends in the plug and receptacle) are not critical since tolerance is provided by the slack taken up in the bowed receptacle fiber (the terminal portion of the fiber secured to the plug does not bow, but always remains straight). The ends of the fibers may be prepared by simply cleaving and beveling; the end faces may optionally be cleaved at an angle (i.e., non-orthogonal to the fiber axis) to reduce signal reflections.

Many fiber optic splices employ plate elements having fiber-receiving grooves, with mechanisms for clamping the terminal ends of the fibers in a common groove. Some of these devices are designed to interconnect a plurality of pairs of fibers, such as the splice shown in U.S. Pat. No. 5,151,964. In U.S. Pat. No. 4,028,162, fibers approach alignment grooves at a glancing angle and are held temporarily while a connector plate is adhered to the interconnected fibers. For other examples of techniques involving bowed fibers entering alignment grooves, see U.S. Pat. Nos. 4,077,702, 4,148,559, 4,322,127 and 5,080,461, and French Patent Application No. 2,660,442. Some of the connector designs using the principle of bowing a fiber into a fiber-alignment groove are rather complex and require many parts, such as the designs seen in U.S. Pat. Nos. 4,045,121, 4,218,113 and 4,767,180.

Such an attachment system may be mechanical, such as a clamp or set of clamps or it may be a type of adhesive. A mechanical system may also include strength members such as layers of stranded steel wire, as disclosed in U.S. Pat. No. 5,539,849.

Useful adhesives for termination must be capable of bonding to the outer surface of the fiber, which may be formed from materials such as glass, epoxy silicones, and the like. It also must be capable of bonding to other materials used in fiber optic cables and their terminations, such as polymeric coating layers, and strengthening fibers used to surround the optical fibers, and plastics from which the holder is formed. The strengthening fibers are typically aromatic polyamide fibers derived from p-phenylenediamine and terephthaloyl chloride, available commercially as Nomex® or Kevlar®.

U.S. Pat. No. 4,699,462 discloses a method for forming a termination between a fiber optic cable having a centrally positioned optical fiber, a plurality of surrounding reinforcements, and a component housing. An adhesive, preferably a heat activated adhesive, is applied within the termination and heat shrink tubing is applied in order to force the reinforcement fibers into adhesive engagement with the adhesive layer. Bond formation occurs primarily at the interface between the cladding on the optical fiber core, and reinforcement strands. The adhesive does not provide bonding to the heat shrink tubing; it is present to provide reinforcement to the termination.

U.S. Pat. No. 5,058,984 discloses a fiber optic cable connector comprising a plastic outer sleeve to be optically couple to another optical fiber cable, carrying at one end, connection means for coupling, a tubular gripping member which adheres the fiber to the outer sleeve or holder, which is deformed by application of force so as to grip the end portion of the plastic outer sleeve and a ferrule mounted within the other end of the connector body supporting an exposed end portion of an optical fiber. The optical fiber is adhered to the ferrule with adhesive material. The ferrule is ceramic and the exposed end of the fiber is set with a light curable resin, generally blue light where the ferrule is formed of zirconia. This allows a setting time to be reduced to about 60 seconds. It is disclosed that such adhesive might not adhere sufficiently strongly to the plastics outer sleeve; therefore the adhesive material is used to secure the end portion within the ferrule, and does not need to provide any adhesive to the plastic outer sleeve.

U.S. Pat. No. 5,048,915 discloses a terminus wherein the optical fiber, buffer and outer jacket of the cable are held securely to a terminus body by means of an adhesive, which is placed into the bore portion of the terminus as ring-shaped pellets through which the fiber can pass, and subsequently heated to form a viscous but flowable state.

U.S. Pat. No. 5,321,784 discloses pull-proof, modular fiber optic connector systems which may be secured by means of epoxy resins.

As can be seen, conventional fiber optic connector assemblies have required the use of additional positioning or bonding means in order to resist disruptive force, even with the use of adhesives. This has been especially true for optical fibers have epoxy silicone inner coatings, close to the cladding, which are particularly difficult to adhere. Issues have also existed regarding means for introducing the adhesive. It would be very desirable to eliminate such means and be able to provide a system wherein the bond is formed solely from an adhesive which adheres the optical fiber to the outer holder of the connector, and adheres to the fiber as well as the inner epoxy silicone coating, the strengthening fibers, and the outer polymeric coating without requiring additional positioning means such as heat shrink tubing, gripping members and the like.

SUMMARY OF THE INVENTION

The invention provides an optical fiber connector comprising an optical fiber, and a termination or interconnection bonded in place by means of a curable adhesive.

Specifically, the invention provides a curable adhesive composition for forming a bond between optical fibers having an epoxy silicone inner coating and fiber connector bodies, such composition comprising an epoxy resin; and a curative admixed therewith, such curative comprising an amino-substituted polysiloxane including more than one primary amino group and having a molecular weight from about 150 to about 1,000 wherein the adhesive composition has an initial viscosity, before curing, below about 100 Pascal-seconds, and the bond has a fiber pull-out force above about 1 kg.

Also provided is a fiber optic connector including a holder for one or more optical cables, each optical cable having an optical fiber surrounded by an inner coating surrounded by strengthening fibers, all of which are surrounded by at least one outer polymeric coating layer, wherein the optical cable is bonded to the connector by means of the curable adhesive.

Preferred curable adhesive compositions of the invention comprise a blend of epoxy resin components including at least one product of reactions of epihalohydrin and aromatic polyhydro-phenolic compounds, including glycidyl ethers of bis-phenol A compounds, or phenolic resins such as a phenol-formaldehyde resin.

The terms used herein have the following meanings.
1. The term "plug" means an article, which is present in a connector, for retaining and selectively aligning the first optical fiber in a connector. Plugs are insertable into the receptacle to form a connection or termination.
2. The term "receptacle" means an article present in a connector, for retaining and selectively aligning the second optical fiber in a connection.
3. The term "holder" means that portion of the plug which holds the first optical fiber in place.
4. The term "connector" means an article for forcing the end of a first optical fiber towards an end of a second optical fiber in contact in the end of the first optical fiber. A connector includes a plug and a receptacle.
5. The terms "termination" and "connection" mean the point at which a first optical fiber is forced into contact with either a second optical fiber or an optoelectronic device.
6. The term "epoxy" means a resin containing at least one epoxide group per molecule.
7. The terms "curative" and "curing agent" are synonymous and mean a composition comprising a material, e.g., a primary amine material, which will polymerize an epoxy compound.

As used herein, all parts, percents, and ratios are by weight, unless specifically stated otherwise.

BRIEF DESCRIPTION OF THE DRAWINGS

FIG. 1 shows a side view of a fiber-optic connector in which the adhesive of the invention is useful.

FIG. 2 is a cross-sectional side view of a fiber-optic connector in which the adhesive of the invention is useful.

DETAILED DESCRIPTION OF THE INVENTION

Figure 1:
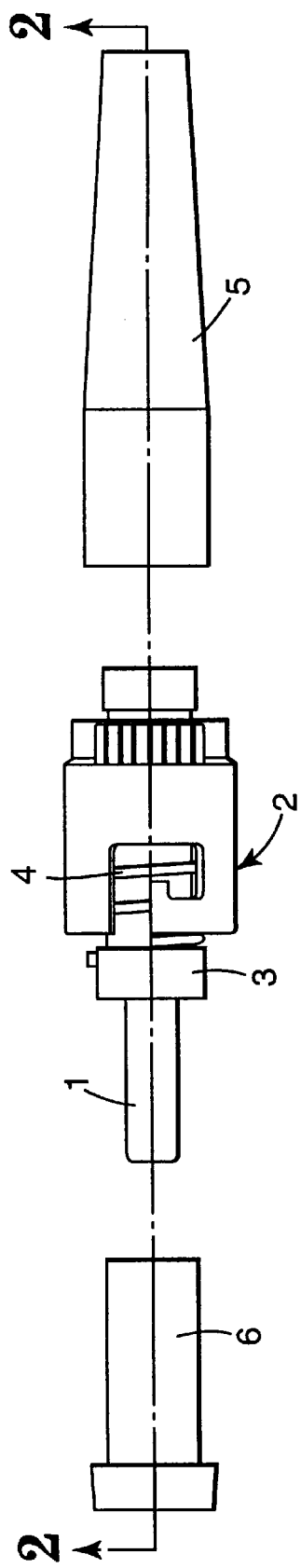
FIGS. 1 and 2 illustrate one embodiment of a fiber optic connector useful in accordance with the present invention.

Optical fiber assemblies of the invention comprise at least one optical fiber having an epoxy silicone inner coating in a holder, adhered to the holder by means of a curable adhesive.

Adhesive compositions of the invention comprise at least one epoxy resin. Useful epoxies may contain one or multiple epoxide groups per molecule. It may be monomeric or polymeric, saturated or unsaturated, aliphatic, cycloaliphatic, aromatic or heterocyclic and may be substituted with other substituents such as hydroxyl groups, ether radicals, halogen atoms and the like. The epoxy groups may be terminal or inner 1,2-epoxy groups and may be linked to an oxygen atom, i.e., glycidyl ether or glycidyl ester groups.

Epoxy compounds having low epoxide equivalents, in the range of about 90 to about 250, are preferred because of their lower viscosity, although higher equivalent weight compounds, including those up to about 950, with melting points up to about 70° C., offer advantages where viscosity is not a factor, including liquid epoxy compounds, having an epoxy equivalent weight of from 170 to about 220.

Suitable examples include epoxy compounds from the reaction of polyphenols and epihalohydrins, polyalcohols and epihalohydrins, polycarboxylic acids and epihalohydrins, amines and epihalohydrins, sulfur containing compounds and epihalohydrins, mixtures of the above compounds and epihalohydrin, polyisocyanates and 2,3-epoxy-1-propanol and from epoxidation of olefinically unsaturated compounds.

Preferred epoxies include the products of reactions of epihalohydrin and aromatic polyhydro-phenolic compounds, including glycidyl ethers of bis-phenol A compounds, or phenolic resins such as a phenol-formaldehyde resin. Suitable examples include polyglycidyl ethers of polyhydric phenols, for example, bis(4-hydroxyphenyl)methane, poly(bisphenol A-coepichlorohydrin, glycidyl ether, 2,2-bis(4-hydroxyphenyl) propane, bis(4-hydroxylphenyl)sulfone, tris(4-hydroxylphenyl)methane and 2,2-bis(4-hydroxyphenyl)-1,1,1,3,3,3-hexafluoropropane and the like, and reaction products, of monovalent or higher valent phenols with aldehydes, in particular, formaldehyde, commonly called Novolak resins. Commercially available resins from bisphenol A and epihalohydrin include Epon® 826, and Epon® 828 from Shell Chemical Company. A typical Novolak resin is "D.E.N. 431" from the Dow Chemical Company.

Other suitable polyepoxides include but are not limited to glycidyl ethers of aromatic amines, such as N,N,N',N'-tetraglycidyl methylene dianiline; glycidyl esters of polyvalent aromatic, aliphatic and cycloaliphatic acids, such as diglycidyl phthalate and hexahydrophthalic acid diglycidyl ester; glycidyl ethers of polyhydric alcohols, such as the diglycidyl ether of hydrogenated bisphenol A; epoxidation products of polyunsaturated compounds such as certain vegetable oils; epoxidized polymers such as epoxidized butadiene-acrylonitrile copolymer; epoxides of cycloaliphatic esters of dicarboxylic acids, such as bis(3,4-epoxycyclohexyl methyl)-adipate; epoxides of cycloaliphatic esters, such as 3,4-epoxycyclohexylmethyl-3,4-epoxycyclohexane carboxylate, and the like; hydantoin epoxy resins; and glycidyl ethers of polypropylene ether glycols, such as "D.E.R. 736" available from Dow Chemical Company.

Numerous additional suitable polyepoxide materials are commercially available or readily prepared using well known techniques and these will be apparent to those skilled in the art.

The ratio of the epoxy component to the curative component typically ranges from about 1:1 to 1:1.35, with the preferred ratio being about 1:1.

The epoxy component can include more than one type of epoxy compound, in fact a blend of such compounds is preferred. Preferred blends comprise from about 50% to about 60% of a poly(bisphenol A-co-epichlorohydrin) glycidyl endcapped resin, most preferably about 60%; from about 30% to about 50% of a phenol-formaldehyde polymer glycidylether, most preferably about 40%, and from 0 to about 5% of a trimethoxysilylpropyl glycidyl ether, most preferably about 1%.

Compositions also include at least one curative agent. Preferred agents are amine curatives. Illustrative of these materials are difunctional and trifunctional aminopropyl-terminated polydimethylsiloxanes formed by reaction of aminopropyl trialkoxysilanes with octamethyl cyclotetrasiloxane or the like, and polyethers containing aromatic amine end groups such as anthranilic acid esters. Useful amine curative agents include a low molecular weight silicone diamine.

Useful examples include 1,3-bis(3-aminopropyl)-1,1,3,3-tetramethyldisiloxane.

It is most preferred that the amine curative agent is composed of up to about 20%

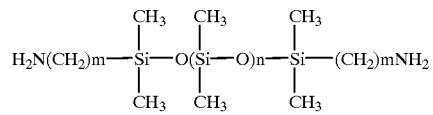

wherein m is from about 2 to about 5; and n is from about 0 to about 5. (percentages based on curative agents only), preferably about 9% poly(bisphenol A-co-epichlorohydrin) glycidyl end-capped, up to about 15% preferably about 5% diethylenetriamine, up to about 15%, preferably about 6% bis(3-aminopropyl)ether of diethylene glycol, and up to 100%, preferably about 80% 1,3-bis(3-aminopropyl)-1,1,3,3-tetramethyldisiloxane.

DETAILED DESCRIPTION OF THE DRAWINGS

The adhesive of the present invention may be used with a variety of different connector designs.

Figure 2:
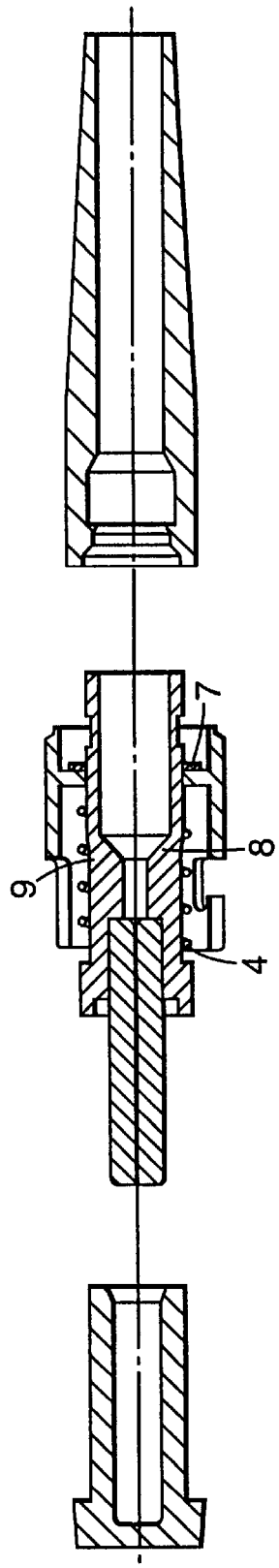

One of the earliest connector designs to become standardized in the industry is the "ST" type (ST is a registered trademark of American Telephone & Telegraph Co.) fiber optic connector. Such a connector is commercially available from Minnesota Mining & Manufacturing Company as 3M 6105 "ST" Connector. This design incorporates a bayonet-type fastener for quick interconnect, and a coupling having one or more outwardly extending projections and a rotatable female socket having a spiral slot therein for receiving the projection. FIG. 1 and FIG. 2 show such a connector which is compatible with existing ST receptacles 6. The connector of FIG. 1 typically includes a ferrule 1 held by a ferrule collar 3. As shown in FIG. 2, the entire assembly is located in a housing or body 9. A spring 4 surrounds a portion of the body 9. A bushing 8 having a c-clip 7 assists in the insertion and guides the optical fiber into the ferrule collar 3. The entire assembly is located in a slidable housing or shell 2 which serves to actuate the latch members. A boot 5, (See U.S. Pat. No. 5,101,473, incorporated herein by reference) is also provided for strain release.

The epoxy silicone coated optical fibers are secured to the holder or body 9 of FIG. 2 by use of the adhesive of the invention.

The adhesive is injected through holes in the connector for that purpose, and cured. The adhesive should adhere to the outer cable coating, which may be epoxy silicone, polvinylchloride or a polyolefin, where such is still present as well as the strengthening fibers, e.g., Kevlar®, in those areas where the outer coating has been stripped away, to the inner epoxy silicone layer to hold the fiber in position. To place the adhesive into the assembly, simply place both components of adhesive into a syringe-like applicator (if desirable, the adhesive may be provided in a two part syringe-type applicator), over the ferrule collar and inject the adhesive into the holder. The needle is inserted into the collar end of the making sure to seat it squarely in the bottom of the adhesive reservoir. The epoxy is injected into the connector until a small amount of epoxy is visible on the ferrule tip.

Variations of "ST" type connectors exist which, e.g., provide means for aligning the ferrule, or are push-pull connectors, compatible with ST receptacles, and like improvements.

Other types of connectors in which this adhesive composition is useful are those known as FC connectors, which are similar to ST connectors, but which do not have bayonet-style fastening. Yet another type is a push-pull fiber optic connector which is known as the SC connector. This design also utilizes a double-ended receptacle but both the receptacle and the plug have rectangular cross-sections.

Connectors may be formed of any durable light transmitting material, preferably an injection moldable polymer such as polycarbonate, VALOX (a polyester sold by General Electric), or RADEL (a polyarylsulfone available from Amoco). The material may include conductive fillers to render the components semiconductive in order to minimize triboelectric charging which can induce fiber end contamination. The boot 5 is preferably formed of low modulus copolyester elastomer, such as that available from RTP of Winona, Minn., under material number 1559×67420B.

Fibers which are to be pre-terminated should be stripped, cleaved and cleaned. If the fibers are in the form of a ribbon which is part of a bundled group of ribbons in a cable, then a portion of the cable jacket must first be cut back to reveal the ribbons. Most cables have several protective layers, and each of these layers must be removed to provide access to the fiber ribbons. Similar steps must be taken to remove the protective layers of a cable having a single discrete fiber. After the fibers have been removed from the protective cable jacket, they are stripped. The stripped fibers are then ready for cleaving which may be accomplished using any one of several commercially available fiber cleavers, such as that shown in U.S. Pat. No. 5,024,363.

Once the craftsperson is satisfied that each of the fibers has an acceptable end face, the fibers may be removed from the cleaver. The fibers may further optionally be provided with an asymmetric treatment, like cleaving so as to impart an angled end face, as taught in U.S. Pat. No. 5,048,908.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

Test Methods

Fiber Pull Test

The fiber is prepared by cutting to 1 meter length and stripping about 2 cm of coating from one end of the fiber using an appropriate fiber stripper. This stripped end was cleaned by wiping twice with a fiber cleaning tissue which has been wet with isopropanol. The epoxy adhesive is prepared according to the examples. The epoxy is transferred to a 5 ml disposable syringe which is equipped with a 3.8 cm blunt tipped, large-bore (18 gauge) needle. The needle is inserted into the collar end of the connector (3M 6105 ST Connector) making sure to seat it squarely in the bottom of the adhesive reservoir. The epoxy is injected into the connector until a small amount of epoxy is visible on the ferrule tip. The stripped and cleaned fiber end into the connector carefully until the resistance due to the unstripped coating contacting the back side of the ferrule is felt. The connector and fiber is placed in a holder in the vertical position. The parts are placed in a 90° C. oven for 30 minutes. The parts are cooled to room temperature and the fiber protruding from the ferrule end is cleaved using a carbide tool.

The pullout test is performed on a 880 Material Test System (MTS Systems Corporation) using a 11.3 Kg load cell and a 5.08 cm displacement cartridge. A mating bayonet part of the connector is installed in the upper jaw. A retention mandrel (63 mm diameter aluminum cylinder) is installed in the bottom fixture. The jaw separation is set at 20.32 cm; measuring from the bottom of the connector (upper jaw) to the tangential contact point on the mandrel (lower jaw). The strain rate is set at 0.254 cm/minute. The average and standard deviations of the peak load are recorded. The test is accurate to 1.0 kg.

EXAMPLES

Example 1

BPA Epoxy and Cyclohexanediamine 1,2-Diaminocyclohexane (0.574g) (Millamine 5260, Milliken Chem.) was mixed thoroughly with poly(bisphenol A-co-epichlorohydrin), glycidyl end-capped (3.76 g) (BPA) (cat. # 40,549-3, Aldrich Chemical Co.). This solution was put into a 5 ml syringe and used for connecting epoxy silicone coated fiber into 3M 6105 ST Connectors.

Example 2

In each case, a fiber having an epoxy silane coating as follows:

A blend of 75 parts of an epoxy functional polysiloxane (Epoxy-functional polysiloxane 1) having a structure

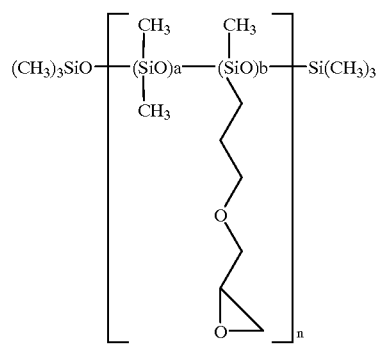

(wherein the ratio of a:b is 1:1, n is from about 40 to about 70, and R is a methyl group), is mixed with 25 parts Epon™ 828 bisphenol A diglycidyl ether resin (available from Shell Oil Co.), and 5.3 parts of a catalyst formed from 40 parts of bis(dodecylphenyl)iodonium hexafluoroantimonate, 60 parts of a $C_{10}$–$C_{14}$ alcohol blend and 4 parts of 2-isopropylthioxanthone was thoroughly mixed and filtered through a 1.0 μm Teflon™ filter disc into an amber glass bottle.

This formulation was then coated and cured to a 125 μm diameter on a 100 μm glass fiber which was freshly drawn from a graded index preform at a draw speed of 45 MPM. Inner and outer buffer layers were applied (DMS 950-075 and DSM 950-103) (acrylated urethanes available from DSM Desotech) then cured simultaneously to diameters of 183 μm and 226 μm, respectively. (See also Example 3 of U.S. Pat. No. 5,381,504).

This fiber was cut to 1 meter in length. On one end of the fiber about 15 mm of the outer two polymer coats were stripped off using a stripping tool. This stripped portion of the fiber was then cleaned using isopropanol and a lint-free fabric wipe. The 3M 6105 ST Connector was filled with the test adhesive using a needle tipped 5 ml syringe. The stripped fiber was inserted into the ferrule. The connector was placed in a holder in the vertical position and heated in an oven at 90° C. for 30 minutes. After cooling the exposed fiber end was cleaved using a cleaving tool. The bonded fiber was allowed to stand at room temperature for 2 days before testing for pullout values.

Example 3

BPA Epoxy Cyclohexanediamine, and Siliconediamine (SiDA)

1,2-Diaminocyclohexane (1.00 g) was mixed thoroughly with 4.00 g of 1,3-bis(3-aminopropyl)-1,1,3,3-tetramethyldisiloxane (SiDA) (cat. # B1710-KG, United Chemical Technologies, Inc., 2731 Bartram Road, Bristol, Pa. 19007). A portion of this solution (1.006 g) was mixed thoroughly with 3.76g of BPA.

Example 4

Pullout Data on Examples 1 and 3

The values are recorded as the peak load on the sample at break or pullout.

| Example # | Peak Load (kg) | Comments |
|---|---|---|
| 1 | 1.286 ± 0.145 | all pullouts |
| 3 | 2.881 ± 0.267 | all breaks |

Example 5

Cyclic Siliconetriamine (SiTA)

3-Aminopropylmethyldiethoxysilane (cat. #A0742-KG; United Chemical Technologies, Inc., 2731 Bartram Road, Bristol, Pa. 19007) (20.0 g) was mixed with 100 ml of water and heated at 70° C. for 2 hours (mixture was clear). The water was stripped off using a rotary evaporator. Testing using infrared radiation and nuclear magnetic resonance was consistent with the cyclic structure below:

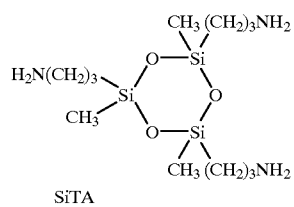
SiTA

Example 6

SiTA Curing Agent

A solution of 1.8438 g of SiTA and 2.1675 g of bis(3-aminopropyl)ether of diethylene glycol (BADG) (CAS# 4246-51-9) (Aldrich Chem.) was prepared by stirring overnight under nitrogen.

Example 7

Resin Formulation

PBA (6.3998g) and phenol-formaldehyde polymer glycidylether (4.1117 g, CAS# 28064-14-4, Aldrich Chem. Cat. #40,676-7) were heated together at 75° C. and mixed until a solution occurred.

Example 8

SiTA Epoxy Adhesive

The resin formulation of Example 7 (1.8444 g ) was mixed thoroughly with 0.5661 g of the SiTA curing agent (example 6). This adhesive was loaded into a 5 ml syringe.

Example 9

SiTA & SiDA Curative Agent

SiTA (0.4998g), bis(3-aminopropyl)ether of diethylene glycol (0.6024 g, BADG, CAS# 4246-51-9, Aldrich Chem. Cat. # 36,951-9), and SiDA (7.9994 g) were mixed thoroughly under nitrogen. To this solution was added 0.8900 g of BPA. The solution was stirred at room temperature for 2 hours.

Example 10

SiTA & SiDA Epoxy Adhesive

The resin formulation of Example 7 (1.8445 g) was mixed thoroughly with 0.6964 g of SiTA & SiDA curative agent (example 9). This adhesive was loaded into a 5 ml syringe.

Example 11

Pullout Data on Examples 8 and 10

| Example # | Peak Load (kg) | Comments |
|---|---|---|
| 8 | 2.097 ± 0.725 | ⅔ are pullouts |
| 10 | 3.117 ± 0.480 | all breaks |

Examples 12–19

SiDA in Tra-Bond FS482 Epoxy Adhesive

SiDA was added to Tra-Bond FS482 curative agents (Tra-Con, Inc., Bedford, Mass.) in various ratios according to the table below. This SiDA/Tra-Bond curative agent (the combination of the Tra-Bond FS482 and SiDA) was then mixed with Tra-Bond FS482 resin in the ratio listed in the table. The various adhesives were then tested for pullout values with coated fiber.

| Ex. # | % SiDA | Wt. Tra-Bond Resin/ Wt. SiDA/ Tra-Bond curative (g) | Wt. Tra-Bond curative (g) | Wt. SiDA (g) | Peak Load (kg) |
|---|---|---|---|---|---|
| 12 | 0 | | | | 0.417 ± 0.081 |
| 13 | 5.29 | 100/31.7 | 7.8 | 2.2 | 1.323 ± 0.874 |
| 14 | 9.85 | 100/32.67 | 6.0 | 4.0 | 1.459 ± 0.598 |
| 15 | 14 | 100/33.52 | 4.5 | 5.5 | 1.540 ± 1.015 |
| 16 | 17 | 100/34.09 | 3.5 | 6.5 | 2.954 ± 0.435 |
| 17 | 20.72 | 100/34.95 | 2.0 | 8.0 | 3.144 ± 0.254 |
| 18 | 23 | 100/35.35 | 1.3 | 8.7 | 3.343 ± 0.168 |
| 19 | 26 | 174/62 | 0 | 10 | 2.396 ± 0.897 |

Example 20

Pendant Silicone Amine Material

GE 88849T silicone diamine (10 g, mol. Wt. 894, General Electric Co.), 3-aminopropylmethyl diethoxysilane (4 g, A0742, United Chemical Technologies, Inc.), polydimethylsiloxane silanol (2 g, PS340, United Chemical Technologies, Inc.), and 2 drops of 50% aqueous cesium hydroxide were heated at 150° C. under nitrogen for one hour. Testing with nuclear magnetic resonance imaging was consistent with the following structure:

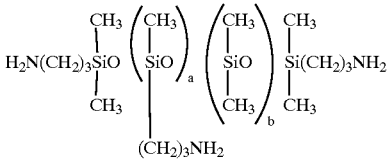

wherein a is 1 and b is about 2.4.

Example 21

Pendant Silicone Epoxy

Tra-Bond FS482 resin (1.74 g), a commercially available adhesive was mixed thoroughly with Tra-Bond FS482 curative (0.31 g), and the pendant silicone material (0.45 g, Example 20) and filled into a 5 ml syringe. This adhesive gave a fiber pullout value of 1.785±0.797 kg.

Examples 22–34

Typical Preparation of Epoxy Adhesives

Several adhesive formulations were made by first preparing a Part A (epoxy resin) and a Part B (amine curative agent). Part A consisted of various ratios of BPA and phenol-formaldehyde polymer glycidylether (Phenolic, CAS# 28064-14-4, Aldrich Chem. Cat. #40,676-7). Part B was prepared by mixing amines Millamine 5260, BADG, SiDA, and/or diethylenetriamine (Aldrich Chem. Cat. # D9,385-6, CAS# 111-40-0) and then adding BPA. This reaction was stirred under nitrogen at room temperature overnight. The final epoxies were then prepared by thoroughly mixing the weighed amounts of Part A and B according to the following table:

| | | | Part A | | Part B | | | | | | |
|---|---|---|---|---|---|---|---|---|---|---|---|
| Example | Wt. of Part A | Wt. of Part B | BPA in A | Phenolic in A | DET | Millamine | BADG | SiDA | BPA in B | Peak Load | Std. Dev. |
| 22 | 1.8264 | 0.6366 | 8.0109 | 12.0237 | 0.5000 | | 0.6014 | 4.0102 | 0.9065 | 2.73 | 0.88 |
| 23 | 1.8268 | 0.6289 | 8.0109 | 12.0237 | 0.6032 | | 0.4005 | 3.9980 | 1.0065 | 1.51 | 0.48 |
| 24 | 1.8245 | 0.6448 | 8.0109 | 12.0237 | 0.4087 | | 0.7999 | 4.0070 | 0.8450 | 2.20 | 0.82 |
| 25 | 1.8338 | 0.6381 | 10.0013 | 9.9921 | 0.5000 | | 0.6014 | 4.0102 | 0.9065 | 3.37 | 0.27 |
| 26 | 1.8350 | 0.6302 | 10.0013 | 9.9921 | 0.6032 | | 0.4005 | 3.9980 | 1.0065 | 2.58 | 1.07 |
| 27 | 1.8363 | 0.6422 | 10.0013 | 9.9921 | 0.4087 | | 0.7999 | 4.0070 | 0.8450 | 2.91 | 0.75 |
| 28 | 1.8423 | 0.6286 | 12.0889 | 8.0050 | 0.4988 | | 0.6022 | 8.0045 | 0.8968 | 2.36 | 1.19 |
| 29 | 0.9114 | 0.3159 | 10.0013 | 9.9921 | 0.6028 | | 0.4024 | 8.0125 | 1.0162 | 3.14 | 0.19 |
| 30 | 0.9159 | 0.3189 | 10.0013 | 9.9921 | 0.4003 | | 0.8010 | 8.0018 | 0.7984 | 2.94 | 0.94 |
| 31 | 1.8338 | 0.5895 | 1.0000 | 1.0000 | 0.6031 | 0.3997 | | 4.0050 | 1.0075 | 2.81 | 0.58 |
| 32 | 1.8354 | 0.5771 | 1.0000 | 1.0000 | 0.5036 | 0.6055 | | 4.0055 | 0.9435 | 3.14 | 0.48 |
| 33 | 1.8337 | 0.5841 | 1.0000 | 1.0000 | 0.4015 | 0.7995 | | 8.0005 | 0.8255 | 2.87 | 0.93 |
| 34 | 1.8540 | 0.5848 | 13.9983 | 6.0038 | 0.4015 | 0.7995 | | 8.0005 | 0.8255 | 2.77 | 0.92 |

Example 35

Adhesive with Genesse Epoxysilicone-Coated Fiber

A triple coat fiber was prepared similar to Example 3 of U.S. Pat. No. 5,381,504 except that the protective coating formulation was a mixture of 42 parts Epon™ 828 and 58 parts of Epoxy-functional polysiloxane 1 having a formula such as that shown in Example 2, and where the a:b ratio is 1:2 (GP554; Genesse Corp.). Five parts of a catalyst formed from 40 parts of bis(dodecylphenyl)iodonium hexafluoroantimonate, 60 parts of a $C_{10}$–$C_{14}$ alcohol blend and 4 parts of 2-isopropylthioxanthone was added to the above mixture before coating on glass fiber.

This fiber was bonded into an ST connector (3M 6105) using the adhesive of example 17. The pullout value was 3.77±0.11 Kg.

A triple coat fiber was prepared similar to that described in example 2, except that the protective coating formulation was a mixture of 60 parts Cyracure™ 6110 (Union Carbide Corp.) and 40 parts of Epoxy-functional polysiloxane 1 below where a:b is 1:1 and R is methyl.

This fiber was bonded into an ST connector (3M 6105) using the adhesive of example 17. The pullout value was 3.14+0.72 Kg.

What is claimed is:

1. A fiber optic connector comprising:
   a) at least one fiber optic cable comprising at least one optical fiber surrounded, surrounded by at least one epoxy silicone coating, both of which are surrounded by a plurality of strengthening fibers, a portion of said cable being stripped in a layerwise manner such that a terminal end of exposed fiber is succeeded by an area of epoxy silicone coated cable, succeeded by an area of strengthening fibers;
   b) a holder for said optical cable, and
   c) a curable adhesive comprising:
      an epoxy resin component; and
      a curative admixed with said epoxy resin, said curative comprising an amino-substituted polysiloxane including more than one primary amino group and having a molecular weight from about 150 to about 1,000, said adhesive composition having an initial viscosity, before curing, below about 100 Pascalseconds, said bond having a fiber pull-out force above about 1 Kg,
   said adhesive being placed into said holder, and allowed to cure.

2. A fiber optic connector according to claim 1 wherein said epoxy resin comprises at least one epoxy compound selected from the group consisting of glycidyl ethers of bis-phenol A compounds, and phenol-formaldehyde resins.

3. A fiber optic connector according to claim 1 wherein said resin component comprises a blend of at least glycidyl ethers of bis-phenol A compound, and at least one phenol-formaldehyde resin.

4. A fiber optic connector according to claim 3 wherein said phenol-formaldehyde resin is phenol-formaldehyde glycidyl ether.

5. A fiber optic connector according to claim 3 wherein said glycidyl ether of bisphenol A is a poly(bisphenol A-co-epichlorohydrin) end-capped with a glycidyl group.

6. A fiber optic connector according to claim 1 wherein said curative comprises at least one low molecular weight amino-substituted polysiloxane including more than one primary amine group.

7. A fiber optic connector according to claim 1 wherein said resin component and said curative comprising an amino-substituted polysiloxane including more than one primary amine group are mixed in a ratio of from about 1:1 to about 1:1.35.

8. A fiber optic connector according to claim 1 wherein said resin component comprises a blend of from about 50% to about 60% of a poly(bisphenol A-co-epichlorohydrin) glycidyl endcapped resin, from about 30% to about 50% of a phenol-formaldehyde polymer glycidylether, and from 0 to about 5% of a trimethoxy-silylpropyl glycidyl ether.

9. A fiber optic connector according to claim 1 comprising a plurality of fiber optic cables.

10. A fiber optic connector according to claim 1 wherein said optical cable is a multifiber ribbon.

11. A fiber optic connector according to claim 1 wherein said curative is selected from the group consisting of a 1,3-bis(3-aminopropyl)-1,1,3,3-tetramethyidisiloxane, and tetramethyldisiloxane, and materials having the general structure:

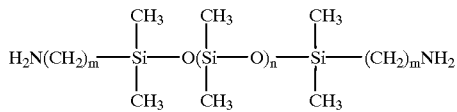

wherein m is an integer having a value of from about 2 to about 5, and n is an integer having a value from about 0 to about 5.

* * * * *